March 20, 1962     O. K. KELLEY ETAL     3,025,719
MULTIPLE STATOR TORQUE CONVERTER
Filed Dec. 28, 1954
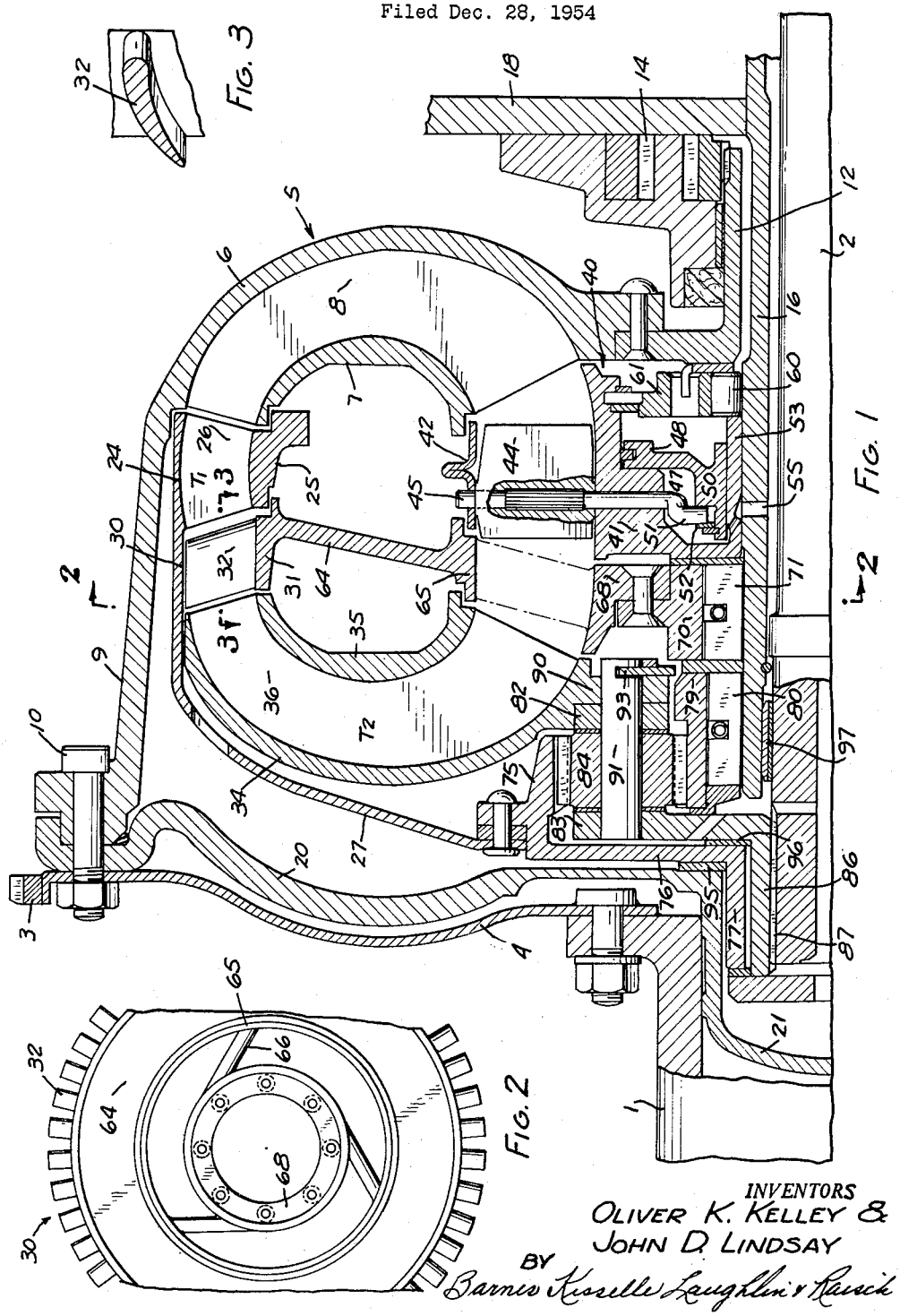
INVENTORS
OLIVER K. KELLEY &
JOHN D. LINDSAY
BY
*Barnes, Kisselle, Laughlin & Raisch*
ATTORNEYS.

United States Patent Office 3,025,719
Patented Mar. 20, 1962

3,025,719
MULTIPLE STATOR TORQUE CONVERTER
Oliver K. Kelley, Birmingham, and John D. Lindsay, Grosse Pointe Woods, Mich., assignors to General Motors Corporation, Detroit, Mich., a corporation of Delaware
Filed Dec. 28, 1954, Ser. No. 478,118
6 Claims. (Cl. 74—677)

This invention relates to a hydrokinetic torque converter, particularly one suitable for automobile transmissions.

The type of torque converter contemplated is one which has rotary elements which circulate hydraulic medium such as oil in a vortexial path in a toroidal space in a chamber and wherein one element is a pump or impeller driven by an engine for causing flow of the oil, which impinges upon blades of a rotor or turbine for transmitting torque thereto, the turbine being connected to a driven member. Such a torque converter embodies a stator, reaction element or guide wheel for changing the direction of the oil. Such reaction element usually remains stationary while re-directing the oil and is therefore called a stator, although at other times it rotates, and it is included as a rotary element in the broad statement above.

The design of the blades of a turbine intended to effect efficient starting of a vehicle, where there is a large difference in the speeds of rotation of the impeller and the turbine, is quite different from the design of the blades of a turbine intended to function efficiently at cruising speeds of a vehicle, wherein there is not much difference between the speeds of the impeller and turbine. It has previously been proposed to use two relatively rotatable turbines geared to the output shaft at different speed ratios. The first to receive oil from the pump has each blade disposed with its principal chordal plane at a high or large angle to the plane defined by the axis of rotation and a radius through the blade. An example is in the application of one of us, Kelley, S.N. 724,204 filed March 26, 1958, as a continuation of S.N. 317,951 filed October 31, 1952, now abandoned, the disclosure of which is incorporated herein by reference. This design gives high torque multiplication on starting. The second turbine, which receives oil discharged from the first turbine, is bladed at a lower angle and is intended both to provide torque multiplication at intermediate speeds and to provide coupling, or drive at substantially one-to-one speed ratio, at higher speeds.

Previous attempts to design such two-turbine torque converters have resulted in such blade angularity that oil leaving the first turbine strikes the second at unfavorable angles, particularly on starting and at low speeds, which caused spatter or shock loss and exerted an undesirably low torque on the second turbine. In some examples, on starting, the oil from the first turbine exerts a backward torque on the second turbine, which is so much resistance to movement of the vehicle. An example is disclosed in the U.S. patent issued to one of us, Kelley, No. 2,782,659 Feb. 26, 1957, the disclosure of which is incorporated herein by reference.

It is an object of the invention to improve the torque multiplication and coupling characteristics of such torque converters over a wide range by directing the oil leaving the first turbine into the second turbine at favorable angles. This may be accomplished for example by placing a reaction member between the first and second turbines. Some of the advantages of the invention can be realized without the usual reaction member between the second turbine and pump, but we prefer to have a second reaction member between the second turbine and the pump. This latter arrangement is especially advantageous where the two turbines drive the car at different speed ratios during the period when the car is being started or driven at high torque ratios, for example, where the connection of the first turbine to the output shaft is through a reduction gear.

The reaction members may be positioned respectively in the radially outward region and the radially inward region of the torus chambers and preferably are held against reverse rotation but permitted to rotate forwardly when not functioning as reaction members, as is well-known in the art. The terms "radially outward" and "radially inward" as used herein have, as reference point, the center of rotation of the torque converter as a whole.

The invention is applicable to torque converters in which a reaction member is adjustable, as illustrated for example, in application of one of us, Kelley, S.N. 403,813 filed Jan. 13, 1954, the disclosure of which is incorporated herein by reference. Preferably, the radially outward reaction member has its one-way mounting entirely independent of the inner reaction member.

A torque converter constructed in accordance with the invention is shown in the accompanying drawings in which, FIG. 1 is the upper half of an axial section of a torque converter, FIG. 2 is a fragmentary cross section on the line 2—2 of FIG. 1, showing the construction of one of the outer reaction members, and FIG. 3 is a section on the line 3—3 of FIG. 1 showing a blade form of the outer reaction members.

The crankshaft of an engine, such as an automobile engine, is represented at 1, and a driven member or output shaft at 2 which may drive an automobile vehicle. Secured to the crankshaft 1 is a plate 4, which drives an impeller 5 with a toroidally outer wall 6, a toroidally inner wall 7 and vanes or blades 8. An extension of the outer wall 6, as shown at 9, is attached to the plate 4 by bolts 10. The impeller has a hub portion 12 which serves to drive a pump 14 for supplying oil to the torque converter and for other purposes. There is a fixed reaction support in the form of a sleeve 16 through which the shaft 2 extends and it is held stationary by the housing or casing 18 normally enclosing the torque converter.

It will be appreciated that as the engine rotates the impeller, its vanes cause a flow of oil through the torus chamber counter-clockwise as FIG. 1 is viewed. The torque converter is enclosed by a forward plate 20 secured to the plate 4 by the bolts 10 and which has a hub portion 21.

In the radially outward region of the torque converter, and next adjacent the outlet end of the impeller, is a turbine T1 with an outer wall 24, an inner wall 25, blades 26 and torque transmitting flange 27. A first stator 30 is positioned next adjacent the turbine T1 and it has a toroidally inner wall 31 and blades 32. As shown in FIG. 2, and as customary in the art, there are many blades 32. The remaining portion of this stator will be later described. The toroidally outer wall 24 of the turbine T1 overlies the vanes 32 of the stator 30 in close proximity thereto but rotatable with respect thereto.

A second turbine T2 has a toroidally outer wall 34, a toroidally inner wall 35 and blades 36, and the inlet end of this turbine is positioned adjacent the stator 30. There is a second stator generally indicated at 40 positioned between the outlet end of the turbine T2 and the inlet end of the impeller in the radially inward part of the torus chamber. The body 41 of this stator constitutes part of the outer wall of the chamber and the stator has a toroidally inner wall member 42. The stator has a plurality of vanes 44 each non-rotatably mounted on a spindle 45 journalled in the inner wall 42 and in the body 41. The body 41 is formed to provide a control 47 with a piston 48 therein. The piston has a hub portion 50 and each spindle 45 has a crank 51 connected to the hub portion. The crank 51 is positioned in an annular groove defined by a ring 52 spaced from an annular shoulder or hub 50. The cylinder is of annular form, as is the piston, and has an inner wall 53 upon which the hub of the piston works. Hydraulic medium may be introduced into the cylinder 47 through a passage 55 in the reaction sleeve and one or more ports in the hub 53. With this construction the vanes 44 may be given at least two positions. One position is with the piston 48 positioned to the left as FIG. 1 is viewed, and another position is with the piston 48 shifted to the right by hydraulic pressure thus rocking the spindles and the vanes.

The inner stator 40 is connected to the reaction sleeve 16 by a one-way brake or unidirectional coupling illustrated as in the form of rollers 60 positioned between the reaction sleeve and an outer race 61 secured to the body of the stator. This brake may be of the cam and roller type, or of the sprag type, both of which are known to those versed in the art, and the brake holds the inner stator from reverse rotation but permits the stator to rotate forwardly, that is, in the sense of rotation of the impeller.

The outer stator 30 is carried by a supporting structure which may be integrally formed with the inner wall 31 (FIG. 2). This supporting structure includes a web 64 which extends through the central part of the torus chamber and which has a wall section 65 which with the web 64 forms the stator body portion. Struts 66, three of which are shown in FIG. 2, extend through the torus chamber between the turbine T2 and the stator 40 and connect to a radially inner wall section 68 which forms part of the outer wall of the torus chamber and which in turn is connected to a hub 70. The wall 68 and hub 70 together form an inner support for the stator 30. A one-way brake illustrated at 71 connects the hub 70 with the reaction sleeve 16 to hold the outer stator 30 against reverse rotation relative to the reaction sleeve but which permits it to rotate forwardly. The brake 71 is shown as being of the sprag type.

A widely accepted definition of strut is any bar or piece designed to resist pressure, or compressive stress, in the direction of its length, as a member in a frame structure, or machine; opposed to tie or stay. As seen in FIG. 2, each strut 66 has a finite and significant thickness in the direction transverse to its length. The outer end of each strut 66 is joined to the ring 65 throughout this thickness and the inner end is joined to the hub 68 throughout this thickness. The center line of the strut may be considered to join the ring 65 at a point lying on one particular radius from the center of rotation of the torque converted. The inner end of the strut is displaced circumferentially from this particular radius, in fact the inner end is displaced circumferentially as far as is possible while maintaining the entire thickness of the strut in contact with the hub 68. This means that the outer edge of the strut which is located in the counterclockwise direction from the center line of each strut, as FIG. 2 is seen, is tangential to the hub 68. This results in the struts being angularly disposed so that when forces of oil on the blades 32 tend to rotate the stator backward, this reverse torque is sustained by compressive forces in the struts, that is to say the struts are loaded in the direction of their length.

The struts 66 are preferably round to offer minimum resistance to flow of oil through the converter, for all angles of flow from the turbine T2. Thus a minimum number of struts of minimum size may be employed and these offer a minimum interference of flow of oil through the torus chamber regardless of the direction of the flow of oil past the spokes. Considering FIG. 2, the stator is rotatable clockwise but is held against counterclockwise rotation by the unidirectional coupling 71.

The turbine T1 is connected to the driven shaft 2 for the transmission of torque through planetary reduction gearing. The flange 27 is connected to a ring gear 75 integrally formed with a body portion 76 terminating in a hub 77. There is a sun gear 79 interconnected with the reaction sleeve 16 by a one-way brake or unidirectional coupling 80. The coupling 80 is shown as being one of the sprag type. This coupling serves to hold the sun gear against reverse rotation but permits the sun gear to rotate in a forward direction.

The planetary gearing has a carrier, one element of which is shown at 82 and another element of which is shown at 83, and the carrier is provided with a plurality of planet gears 84 the teeth of which mesh with those of the ring gear 75 and the sun gear 79. The carrier member 83 has a hub portion 86 splined or keyed to the driven shaft 2 as at 87. The turbine T2 is connected to the carrier so that the turbine T2 and carrier rotate together. To this end, the turbine T2 has a portion 90, which is an extension of its outer wall, mounted on the pins 91 which support the planet gears 84. The turbine T2 may be held to the pins 91 by a ring 93.

The structure, of course, involves some bearings associated with relatively rotatable parts and bearings for taking thrust axially and it is believed that these bearings are readily discernible in the drawings and that detailed description of these bearings is not necessary. Suffice it to say that there is a thrust bearing 95 between the ring gear 75 and the enclosure member 20, a thrust bearing 96 between the ring gear and the carrier, and a bearing 97 between the shaft 2 and the reaction sleeve 16, just to name some.

Thus, it will be seen that the several elements of the torque converter combine to provide a torus chamber which is to be maintained full of oil under suitable pressure. Rotation of the impeller causes flow of oil through the torus chamber. As is known, the impeller gives the oil a velocity which has both an axial component, that is parallel to the axis of the rotor, and a tangential component, that is tangential to the circle described by the motion of the particular point on the impeller at which each particular particle of oil leaves the impeller. The axial component and the deflecting effect of the outer shell of the torus tends to produce circular motion about the section of the torus in a counterclockwise sense as seen in FIG. 1, it being assumed that the impeller rotates in a clockwise sense as in FIG. 2. The tangential component of velocity and the deflecting effect of the walls of the torus chamber tend to effect circular motion about the axis of the impeller clockwise as FIG. 2 is viewed. These components create a resultant vortexial motion of each particle of oil, the path of which is like a corkscrew the axis of which has been wound into a circle whose center is on the axis of the torque converter. The turbine T1 is primarily for the purpose of transmitting torque to the output shaft 2 when the vehicle is being started or is operating at low speeds while the engine is running much faster. The ring gear 75 rotates with turbine T1. The carrier is secured to the driven shaft 2. The brake 80 holds the sun gear stationary. Therefore, the planet gears revolve about the stationary sun gear with the result that the carrier rotates at a speed lower than that of the ring gear and turbine T1. Thus there is a multiplication of the torque by the gearing in addition to that provided by the torque converter.

On starting, the impeller is rotating relatively fast while the turbines at first are still and then begin to rotate slowly. In such conditions oil leaving the turbine T1 flows in a direction having a backward tangential component with reference to the motion of turbine T1. If there were no stator between T1 and T2 the direction of the oil with respect to T2 would depend not only on the relative speeds of T1 and T2 but also on the absolute speed of T1. This direction might have a backward tangential component with reference to T2, and if it did it would try to turn T2 backwards. The blades 32 of the outer stator are so formed and directed that they cause the oil leaving T1 always to exert a forward force on T2 and insure its striking T2 at the most favorable angles throughout the greatest possible range of speeds.

During the period of operation just described the direction of the tangential component of the velocity of the oil is changed from backward to forward by the reaction member which is thus urged to rotate backwardly but prevented from reverse rotation by the one-way brake 71.

As the speeds of the turbines increase with respect to the speed of the pump any negative tangential component of the direction with respect to T2 of the oil leaving T1 is gradually reduced to zero, changes sign and becomes forward. When this tangential component becomes forward or positive with respect to T2 the oil leaving T1 is striking T2 at a favorable angle and the redirecting function of the stator vanes 32 is no longer needed. The stator blades are so designed that at this point the forwardly rotating oil strikes the back, or convex, sides of the blades and rotates the stator forwardly. The stator floats or idles in the stream of oil passing from T1 to T2, the speed of the stator adjusting itself to the velocity of the oil and absorbing no torque.

As speeds increase from a starting condition, the proportion of the torque transmitted by turbine T1 lessens, and due to the change of direction at which the oil strikes its blades, the torque transmitted by T2 increases. For a while both turbines are transmitting torque to the output shaft. A condition occurs when upon further increase of speed turbine T1 ceases to transmit torque and the torque is transmitted entirely by turbine T2. When this occurs the sun wheel 79 rotates forward on its free wheeler and T1 is functionally disconnected from the output shaft and idles or floats in the stream of oil, neither absorbing torque nor exerting any drive on the output shaft.

During the portion of the operation described above, that is while the outer stator 30 is functionally out of operation by rotating forwardly the inner stator 40 continuously functions to redirect the oil from the turbine T2 to the impeller in the manner well known in the art. This is made possible by the independent one-way brake supports of the two stators. When the brake 71 is letting the stator 30 free wheel, the brake 60 is holding the stator 40 against reverse rotation so that it continues to absorb reaction torque and thus continues to cause torque multiplication by the torque converter as a whole. When the speed of the turbine T2 approximates the speed of the impeller the condition known as coupling occurs in which the oil from the turbine T2 strikes the backs of the blades of the inner stator 40 and rotates this forward out of the way, as is well known. The point at which torque multiplication by the turbine T2 ceases and coupling begins depends upon the angle of the stator blades 44. This can be adjusted either automatically or manually when desired, for example for the purposes and at the times described in the Kelley application, S.N. 403,-813, referred to above, or in the application of one of us, Kelley, S.N. 328,090 filed Dec. 26, 1952, now abandoned, the disclosure of which is incorporated herein by reference. When the inner stator is functioning to redirect the oil, the load impressed thereon by the oil tends to turn the inner stator reversely but the inner stator is held stationary by the coupling 60. Ultimately, however, speed and torque conditions are attained where there is no reverse load on the inner stator and it too ceases to function as a stator and may rotate freely forwardly. At this time, the torque converter is functioning essentially as a fluid coupling without torque conversion.

The blades of the turbine T1 are designed and shaped to pick up the load upon starting and carry a large proportion of the load during operation at low speeds, the torque being multiplied by the action of the turbine and reaction member and further multiplied by the gearing.

The blades of the turbine T2 are arranged for effective transmission of torque especially when the speed of the turbine T2 more nearly approximates the speed of rotation of the impeller.

It will be noted that the inner stator can be described as one having two points at which it will cease to function as a stator and will start to rotate or idle forwardly. One point is when the vanes are in one position and the other point is when the vanes are in the other position. These points are not necessarily fixed absolutely with reference to speed, but may vary with varying speed and torque conditions which exist at any one time.

The above-described arrangement has advantages over torque converters as known before our invention. By supporting the first stator 30 by spokes in the path of the liquid, which spokes are in turn supported by a free wheeler near the center of rotation, this stator can be placed between turbines rotating at different speeds, and can free wheel at a speed (related to the turbines) which is determined by the characteristics of the first turbine T1, and is independent of other members in the circuit. This is of important advantage. When the first turbine free wheels, the only resistance to the flow of oil which it offers is that of the three spokes 66. While these are in the path of the oil, the resistance they offer is much less than the resistance which would be effected by the numerous blades 32 were they held stationary. Under these conditions the spokes are not loaded. Also, by placing each spoke at an angle with respect to a plane determined by the axis of rotation and a point in the spoke, the spokes will be loaded in compression when they are loaded at all, that is when the stator 30 tends to rotate backward. This allows us to reduce the size and number of spokes which are required to sustain reaction torque, and this in turn reduces still more the resistance to flow offered by the entire stator 30 when it is idling.

Also, the two independent free wheelers make it possible for the second stator 40 to continue to multiply torque long after the first stator 30 has stopped multiplying torque and is free wheeling. Since on starting, the first turbine rotates faster than the second, and stops delivering torque while the second turbine is delivering torque, as explained above, the first stator should free wheel while the second stator continues to multiply torque in cooperation with the second turbine. If there were not independent free wheelers for the two stators, the first stator either could not free wheel at all, or could not free wheel until the second stator did. This would cause the first stator to offer important resistance to the flow of oil, either continuously or at least during the time the second stator is stationary. Furthermore, the independent free wheelers allow the two stators to free wheel at different speeds, as determined by their blade characteristics, and this further reduces the resistance to flow of oil during coupling.

We claim:

1. A torque converter comprising in combination, input and output members, a forwardly rotatable impeller connected to the input member for circulating liquid vortexially in a closed chamber, first and second relatively rotatable turbines receiving liquid successively from the impeller and at times reversing from forward to backward the tangential component of velocity of liquid through such turbines, the first turbine being connected to the output member by a torque transmitting connection of relatively low speed ratio and the second turbine being connected to the output member by torque-transmitting means of relatively high speed ratio, first reaction means between the first and second turbines, said reaction means including blades which at times reverse from backward to forward the tangential component of velocity of liquid leaving the first turbine and thereby multiply torque between the input and output members, a first one-way brake which holds the first reaction means stationary whenever liquid flows from the first turbine toward the front sides of the reaction blades and which lets the first reaction means rotate forward whenever liquid flows from the first turbine toward the back sides of the reaction blades, second reaction means between the second turbine and the impeller having blades which at times reverse from backward to forward the tangential component of velocity of liquid leaving the second turbine and thereby multiply torque between the impeller and the second turbine, a second one-way brake which holds the second reaction means stationary whenever liquid flows from the second turbine toward the fronts of the reaction blades of the second reaction means and permits forward rotation of the second reaction means whenever liquid flows from the second turbine toward the backs of the blades of the second reaction means.

2. A torque converter comprising in combination, input and output members, a forwardly rotatable impeller connected to the input member for circulating liquid vortexially in a closed chamber, first and second relatively rotatable turbines receiving liquid successively from the impeller and at times reversing from forward to backward the tangential component of velocity of liquid through such turbines, the first turbine being connected to the output member by a one-way torque transmitting connection of relatively low speed ratio adapted to disconnect the first turbine from the output member in response to a predetermined speed of the first turbine relative to the second turbine, and the second turbine being connected to the ouput member by torque-transmitting means of relatively high speed ratio, first reaction means between the first and second turbines, said reaction means including blades which at times reverse from backward to forward the tangential component of velocity of liquid leaving the first turbine and thereby multiply torque between the input and output members, a first one-way brake which holds the first reaction means stationary whenever liquid flows from the first turbine toward the front sides of the reaction blades and which lets the first reaction means rotate forward whenever liquid flows from the first turbine toward the back sides of the reaction blades, second reaction means between the second turbine and the impeller having blades which at times reverse from backward to forward the tangential component of velocity of liquid leaving the second turbine and thereby multiply torque between the impeller and the second turbine, a second one-way brake which holds the second reaction means stationary whenever liquid flows from the second turbine towards the fronts of the reaction blades of the second reaction means and permits forward rotation of the second reaction means whenever liquid flows from the second turbine toward the backs of the blades of the second reaction means.

3. A torque converter comprising in combination, input and output members, a forwardly rotatable impeller connected to the input member for circulating liquid vortexially in a closed chamber, first and second relatively rotatable turbines receiving liquid successively from the impeller and at times reversing from forward to backward the tangential component of velocity of liquid through such turbines, the first turbine being connected to the output member by one-way torque transmitting connection of relatively low speed ratio adapted to disconnect the first turbine from the output member in response to a predetermined speed of the first turbine relative to the second turbine, and the second turbine being connected to the output member by torque-transmitting means of relatively high speed ratio, first reaction means between the first and second turbines, said reaction means including blades which at times reverse from backward to forward the tangential component of velocity of liquid leaving the first turbine and thereby multiply torque between the input and output members, a first one-way brake which holds the first reaction means stationary whenever liquid flows from the first turbine toward the front sides of the reaction blades and which lets the first reaction means rotate forward whenever liquid flows from the first turbine toward the back sides of the reaction blades, second reaction means between the second turbine and the impeller having blades which at times reverse from backward to forward the tangential component of velocity of liquid leaving the second turbine and thereby multiply torque between the impeller and the second turbine, a second one-way brake adapted to hold the second reaction means stationary while the first reaction means is rotating and whenever liquid flows from the second turbine toward the backs of the reaction blades of the second reaction means and permits forward rotation of the second reaction means whenever liquid flows from the second turbine toward the backs of the blades of the second reaction means.

4. In a hydrokinetic torque converter, the combination of a chamber containing means for causing circulation of liquid in a toroidal path in the chamber, said means including a rotatable bladed impeller, a first turbine having blades in the radially outward portion of the chamber with reference to the axis of rotation of the turbine and disposed in the path of the liquid, a second turbine having blades in the path of the liquid downstream from the first turbine, and a stator having blades positioned between the turbines and in the radially outward portion of the chamber; a reaction support disposed substantially axially of and within the chamber, the stator having a body portion extending radially inwardly from its blades and having a central hub joined to the body portion by rigid struts extending through the radially inward portion of the chamber in a position adjacent the outlet end of the second turbine, means supporting the stator hub for rotation with respect to the reaction support including means for holding the stator against rotation reverse to that of the impeller while permitting rotation in the sense of rotation of the impeller, so that the stator, when so held against reverse rotation, changes the direction of flow of the liquid from the first turbine to the second turbine, each of said struts being disposed at such an angle with respect to a plane determined by a point on such strut and by the axis of rotation of the the stator that the struts constitute means for transmitting torque from the blades to the hub by compression forces when the stator is held against reverse rotation.

5. A hydrodynamic torque transmitting device comprising in combination a rotary impeller for circulating liquid in a closed chamber to transmit torque from an input to an output member, a bladed member which is at times rotatable and which receives liquid circulated by the impeller and thereby has torque transmitted to it, means for receiving torque from the bladed member and means in the path of liquid circulated by the impeller for transmitting torque by compressive forces to the receiving means, said torque transmitting means being struts, each of the struts being placed at such an angle with respect to a plane, which plane is determined by the axis of rotation of the strut and a point on such strut that the struts transmit torque from the bladed element to the receiving means by compressive force in such struts.

6. In a hydrokinetic torque converter, the combination of a chamber containing means for causing circulation of liquid in a toroidal path in the chamber, said means including a rotatable bladed impeller, a first turbine having blades in the radially outward portion of the chamber with reference to the axis of rotation of the turbine and disposed in the path of the liquid, a second turbine having blades in the path of the liquid downstream from the first turbine, and a stator having blades positioned between the turbines and in the radially outward portion of the chamber; a reaction support disposed substantially axially of and within the chamber, the stator having a body portion extending radially inwardly from its blades and having a central hub connected to the body portion, means supporting the stator hub for one-way rotation with respect to the reaction support including means for holding the stator against rotation reverse to that of the impeller while permitting rotation in the sense of rotation of the impeller, so that the stator, when so held against reverse rotation, changes the direction of flow of the liquid from the first turbine to the second turbine, and means for transmitting torque by compresison forces in such means from the central body portion of the stator to the hub, said last named means being a plurality of rigid struts each of which has its outer end secured to the body portion and its inner end secured to the hub so that the center line of the inner end is circumferentially displaced from that radius from the center of rotation extending through the center line of the outer end and the displacement is in that direction to place the strut in compression when the hub is held against reverse rotation.

References Cited in the file of this patent

UNITED STATES PATENTS

| | | |
|---|---|---|
| 2,187,937 | Delavaud | Jan. 23, 1940 |
| 2,293,767 | Salerni | Aug. 25, 1942 |
| 2,349,350 | Jandasek | May 23, 1944 |
| 2,603,943 | Evernden | July 22, 1952 |
| 2,616,309 | Russell | Nov. 4, 1952 |
| 2,697,467 | Giannotti | Dec. 21, 1954 |
| 2,737,827 | Seybold | Mar. 13, 1956 |
| 2,737,828 | Seybold | Mar. 13, 1956 |
| 2,739,494 | Russell | Mar. 27, 1956 |
| 2,761,485 | Allen | Sept. 4, 1956 |
| 2,911,852 | Russell | Nov. 10, 1959 |

UNITED STATES PATENT OFFICE
CERTIFICATE OF CORRECTION

Patent No. 3,025,719                         March 20, 1962

Oliver K. Kelley et al.

It is hereby certified that error appears in the above numbered patent requiring correction and that the said Letters Patent should read as corrected below.

Column 2, line 71, after "control" insert -- cylinder --; column 3, line 4, for "or" read -- on --; line 53, for "converted" read -- converter --.

Signed and sealed this 4th day of Septenber 1962.

(SEAL)
Attest:

ERNEST W. SWIDER
Attesting Officer

DAVID L. LADD
Commissioner of Patents